(12) United States Patent
Telkamp et al.

(10) Patent No.: US 6,990,264 B2
(45) Date of Patent: Jan. 24, 2006

(54) 1×N OR N×1 OPTICAL SWITCH HAVING A PLURALITY OF MOVABLE LIGHT GUIDING MICROSTRUCTURES

(76) Inventors: Arthur R. Telkamp, 3691 Fenn St., Irvine, CA (US) 92614; Ying Wen Hsu, 6455 Frampton Cir., Huntington Beach, CA (US) 92648

( * ) Notice: Subject to any disclaimer, the term of this patent is extended or adjusted under 35 U.S.C. 154(b) by 608 days.

(21) Appl. No.: 10/046,416

(22) Filed: Oct. 19, 2001

(65) Prior Publication Data

US 2004/0190818 A1    Sep. 30, 2004

Related U.S. Application Data

(63) Continuation-in-part of application No. 09/837,829, filed on Apr. 17, 2001, now Pat. No. 6,690,847, and a continuation-in-part of application No. 09/837,817, filed on Apr. 17, 2001, now Pat. No. 6,647,170.

(60) Provisional application No. 60/233,672, filed on Sep. 19, 2000, provisional application No. 60/241,672, filed on Oct. 19, 2000.

(51) Int. Cl.
    *G02B 6/26* (2006.01)
(52) U.S. Cl. .............................. 385/16; 385/25; 385/52
(58) Field of Classification Search .................. 385/16, 385/20–23, 25, 31, 38, 50, 52
See application file for complete search history.

(56) References Cited

U.S. PATENT DOCUMENTS

| | | | |
|---|---|---|---|
| 4,693,547 A | 9/1987 | Soref et al. .............. 350/96.13 |
| 5,039,191 A | 8/1991 | Myszka | |
| 5,078,514 A * | 1/1992 | Valette et al. ................. 385/20 |
| 5,235,672 A | 8/1993 | Carson ........................ 395/24 |
| 5,245,458 A | 9/1993 | Taylor ........................ 359/108 |
| 5,278,692 A * | 1/1994 | Delapierre .................. 359/236 |
| 5,357,590 A | 10/1994 | Auracher | |
| 5,596,662 A | 1/1997 | Boscher | |
| 5,612,815 A * | 3/1997 | Labeye et al. .............. 359/320 |
| 5,623,564 A | 4/1997 | Presby | |
| 5,757,986 A | 5/1998 | Crampton et al. ............. 385/2 |
| 5,761,350 A | 6/1998 | Koh ............................. 385/14 |
| 5,828,800 A * | 10/1998 | Henry et al. .................. 385/20 |
| 5,848,206 A * | 12/1998 | Labeye et al. ................ 385/22 |
| 5,920,665 A | 7/1999 | Presby | |
| 5,923,798 A | 7/1999 | Aksyuk et al. ............... 385/19 |

(Continued)

FOREIGN PATENT DOCUMENTS

DE              3817035 C1       8/1989

(Continued)

OTHER PUBLICATIONS

Bahadori, et al., *Automated Fiber-Waveguide Array Alignment*, Journal Optical Communications, Fachverlag Schiele & Schon, Berlin, Germany, vol. 10, No. 2, Jun.1, 1989, pp. 54-55.

(Continued)

*Primary Examiner*—Sung Pak

(57) ABSTRACT

A 1×N or N×1 optical switch based on a plurality of movable MEMS-created platforms, each carrying a light guiding structure such as a waveguide, where the position of the platforms determines which optical path is connected through the optical switch. The MEMS-created platforms are formed integral with the substrate of the optical switch. The waveguides residing on the movable platforms gradually change the direction of the optical signal in order to minimize losses. The movable platforms can move linearly or rotationally, for example. Also described is a method for fabricating such an optical switch and its components by etching from the bottom of the substrate and through the oxide.

100 Claims, 4 Drawing Sheets

U.S. PATENT DOCUMENTS

| | | | |
|---|---|---|---|
| 5,926,594 | A | 7/1999 | Song et al. |
| 5,970,192 | A | 10/1999 | Osugi et al. |
| 5,990,473 | A | 11/1999 | Dickey et al. ......... 250/231.13 |
| 6,072,924 | A | 6/2000 | Sato et al. ..................... 385/18 |
| 6,101,299 | A | 8/2000 | Laor |
| 6,122,423 | A | 9/2000 | You et al. |
| 6,137,941 | A | 10/2000 | Robinson ................... 385/140 |
| 6,148,124 | A | 11/2000 | Aksyuk et al. ............... 385/24 |
| 6,175,675 | B1 | 1/2001 | Lee et al. |
| 6,205,267 | B1 | 3/2001 | Aksyuk et al. ............... 385/19 |
| 6,219,472 | B1 * | 4/2001 | Horino et al. ................ 385/16 |
| 6,253,011 | B1 | 6/2001 | Haake et al. |
| 6,275,326 | B1 | 8/2001 | Bhlia et al. |
| 6,320,993 | B1 * | 11/2001 | Laor ............................. 385/16 |
| 6,388,789 | B1 | 5/2002 | Bernstein |
| 6,411,765 | B1 | 6/2002 | Ono |
| 6,647,168 | B2 * | 11/2003 | Hsu et al. ..................... 385/16 |
| 6,654,523 | B1 | 11/2003 | Cole |
| 6,694,071 | B2 * | 2/2004 | Hsu ............................. 385/16 |
| 6,836,583 | B2 * | 12/2004 | Hsu et al. ..................... 385/16 |
| 2002/0094151 | A1 | 7/2002 | Li |

FOREIGN PATENT DOCUMENTS

| | | |
|---|---|---|
| EP | 0 545 584 | 11/1992 |
| EP | 1004910 A2 | 5/2000 |
| JP | 58068702 | 4/1983 |
| JP | 63063006 | 3/1988 |
| JP | 04177225 | 6/1992 |
| JP | 06109990 | 4/1994 |
| JP | 10123373 | 5/1998 |
| JP | 10-227986 | 8/1998 |
| WO | WO 01/77742 A2 | 10/2001 |

OTHER PUBLICATIONS

Benaissa, K.; and Nathan, A.; "Silicon Anti-Resonant Reflecting Optical Waveguides for Sensor Applications;" *Journal of Sensors and Actuators (A Physical)*, vol. A65, 33-44, 1998.

Brown, K.S., Taylor, B.J.; Dawson; J.M.; Hornak, L.A.; "Polymer Waveguide Co-integration With Microelectromechanical Systems (MEMS) for Integrated Optical Metrology;" *Proceedings of the SPIE (The International Society for Optical Engineering)*, vol. 3276, 1998.

Burcham, Kevin E.; and Boyd, Joseph T.; "Freestanding, Micromachined, Multimode Silicon Optical Waveguides at $\lambda=1.3\ \mu m$ for Microelectromechanical System Technology;" *Journal of Applied Optics*, vol. 37, No. 36, Dec. 20, 1998.

Churenkov, A. V.; "Silicon Micromechanical Optical Waveguide for Sensing and Modulation;" *Journal of Sensors and Actuators (A Physical)*, vol. A57, No. 1, Oct. 1996.

Cook, J.P.D.; Este, G.O.; Shepherd, F.R.; et al.; "Stable, Low-Loss Optical Waveguides and Micromirrors Fabricated in Acrylate Polymers" *Applied Optic Journal*, vol. 37, No. 7, Mar. 1, 1998.

Cornett, Kimberly T.; Heritage, Jonathan P.; Solgaard, Olav; "Compact Optical Delay Line Based on Scanning Surface Micromachined Polysilicon Mirrors;" *2000 IEEE/LEOS International Conference on Optical MEMS*, Kauai, Hawaii, Aug. 21-24, 2000.

de Labachelerie, M.; Kaou, N.; et al., "A Micromachined Connector for the Coupling of Optical Waveguides and Ribbon Optical Firbers;" *Journal of Sensors and Actuators (A Physical)*, vol. A89, No. 1-2, Mar. 20, 2001.

Eng, Terry T.H.; Kan, Sidney C.; and Wong, George K.L.; "Voltage-Controlled Micromechanical SOI Optical Waveguides;" *IEEE TENCON, IEEE Region 10 International Conference on Microelectronics and VLSI—"Asia Pacific Microelectronics 2000"—Proceedings*, 1995.

Eng, Terry T.H.; Kan, Sidney C.; and Wong, George K.L.; "Surface-Micromachined Epitaxial Silicon Cantilevers as Moveable Optical Waveguides on Silicon-on-Insulator Substrates;" *Journal on Sensors and Actuators A, Physical*, vol. A49, No. 1-2, Jun. 1995.

Eng, Terry T.H.; Kan, Sidney C.; and Wong, George K.L.; "Surface-Micromachined Movable SOI Optical Waveguides;" *Proceedings of the International Solid-State Sensors and Actuators Conference—Transducer*, 1995.

Gorecki, Christopher; "Optimization of Plasma-Deposited Silicon Oxinitride Films for Optical Channel Waveguides;" *Journal of Optics and Laser Engineering*, vol. 33, No. 1, Jan. 2000.

Haronian, D.; "Bottlenecks of Opto-MEMS;" *SPIE Proceedings—Mirco-Opto-Electro-Mechanical Systems*, Glasgow, UK , May 22-23, 2000.

Haronian, D.; "Displacement Sensing Using Geometrical Modulation in Reflection Mode (GM-RM) of Coupled Optical Waveguides;" *Journal of Micromechanics and Microengineering*, vol. 8, No. 4, Dec. 1998.

Haronian. D.; "Suspended Optical Waveguide With In-Plane Degree of Freedom or Microelectro-Mechanical Applications;" *Electronics Letters*, vol. 34, No. 7, Apr. 2, 1998.

Hoffmann, Martin; Kopka, Peter; and Voges, Edgar; "Thermooptical Digital Switch Arrays in Silica-on-Silicon With Defined Zero-Voltage State;" *Journal of Lightwave Technology*, vol. 16, No. 3, Mar. 1998.

Jin, Young-Hyun; Seo, Kyoung-Sun; et al.; "An SOI Optical Microswitch Integrated With Silicon Waveguides and Touch-down Micromirror Actuators;" *2000 IEEE/LEOS International Conference on Optical MEMS*, Aug. 21-24, 2000.

Koyanagi, Mitsumasa; "Optical Interconnection Using Polyimide Waveguide for Multi-Chip Module;" *Proceedings of SPIE, Society of Photo-Optical Instrumentation Engineers*, San Jose, CA, 1996.

Kruger, Michiel V.P.; Guddal, Michael H.; et al.; "Low Power Wirless Readout of Autonomous Sensor Wafer Using MEMS Grating Light Modulator;" *2000 IEEE/LEOS International Conference on Optical MEMS*, Kauai, Hawaii, Aug. 21-24, 2000.

Kuwana, Yasuhiro;Hirose, Akinori; Kurino, Hiroyuki; et al.; "Signal Propagation Characteristics in Polyimide Optical Wave-guide With Micro-Mirrors for Optical Multichip Module;" *Japanese Journal of Applied Physics*, vol. 38, No. 4B, Apr. 1999.

Makihara, M.; "Microelectromechanical Intersecting Waveguide Optical Switch Based on Thermo-Capillarity;" *2000 IEEE/LEOS International Conference on Optical MEMS*, Kauai, Hawaii, Aug. 21-24, 2000.

Makihara, M.; Sato, Makoto; Shimokawa, Fusao; et al.; "Micromechanical Optical Switches Based on Thermocapillary Integrated in Waveguide Substrate;" *Journal of Lightwave Technology*, vol. 17, No. 1, Jan. 1999.

Makihara, M.; Shimokawa, F.; and Nishida, Y.; "Self-Holding Optical Waveguide Switch Controlled by Micromechanism;" *IEICE Trans. Electronics (Japan)*, vol. E80-C, No. 2, Feb. 1997.

Maruo, Shoji; Ikuta, Koji; and Ninagawa, Toshihide; "Multi-Polymer Microsterolithography for Hybride Opto-MEMS" has the same information as "Advanced Micro Sterelithography wih Multi UV Polymers (System Development and Application to Three-Dimensional Optical Waveguides)," which is written in Japanese; *Journal of Tansactions of the Institute of Electrical Engineers of Japan*, Part E, vol. 120-E, No. 7, Jul. 2000.

Matsumoto, Takuji; Kuwana, Yasuhiro; Hirose, Akinori; "Polyimide Optical Waveguide With Multi-Fan-Out of Multichip Module System;" *Proceedings from the Optoelectronic Interconnects V*, vol. 3288, San Jose, CA Jan. 28-29, 1998.

Matsumoto, Takuji; Fukuoka, Takeshi; Kurino, Hiroyiki; et al.; "Polyimide Optical Waveguide With Multi-Fan-Out for Multi-Chip Module Application;" *Proceedings of the 27th European Solid-State Device Research Conference*, France, Sep. 22-24, 1997.

Moisel, Jorg; Guttmann, Joachim; Huber, Hans-Peter; "Optical Backplanes With Integrated Polymer Waveguides," *Journal of Optical Engineering*, vol. 39, No. 3, Mar. 2000.

Mueller, Raluca; Pavelescu; and Manea, Elena; "3D Microstructures Integrated With Optical Waveguides and Photodiodes on Silicon," *MELECOB 1998 9th Mediterranean Electromechanical Conference Proceedings*, Vol. 1; May 18-20, 1998.

Namba, Tohru; Uehara, Akihito; et al.; "High-Efficiency Micromirrors and Branced Optical Waveguides on Si Chips;" *Japanese Journal of Applied Physics*, Part 1, vol. 35, No. 2B, Aug. 21-24, 1995.

Oillier, Eric, Chabrol, Claude; et al., "1×8 Micro-Mechanical Switches Based on Moving Waveguides for Optical Fibers Network Switching;" 2000 *IEEE/LEOS International Conference on Optical MEMS*, Aug. 21-24, 2000.

Ollier, Eric; and Mottier, P.; "Micro-Opto-Electro-Mechanical Systems: Recent Developments and LEIT's Activities," *Proceedings of the SPIE—The International Society for Optical Engineering*, vol. 4076, May 22-24, 2000.

Shubin, I.; and Wa, P.L.K.; "Electrostatically Actuated 1×2 Micro-Mechanical Optic Switch;" *Electronics Letters*, vol. 37, No. 7; Mar. 29, 2001.

Storgaard-Larsen, Torben; "Plasma-Enhanced Chemical Vapor Deposited Silicon Oxynitride Films for Optical Waveguide Bridges for Use in Mechanical Sensors;" *Journal of the Electromechanical Society*, vol. 144, No. 4, Apr. 1997.

Voges, E.; Hoffmann, M.; "FBI Optical Waveguides on Silicon Combined With Micromechanical Structures;" *Advanced Applications of Lasers in Materials and Processing; LEOS Summer Optical Meeting*, 1996; *IEEE*, Piscataway, Jew Jersey, 96TH8154.

Yariv, "Universal Relations for Coupling of Optical Power Between Microresonators and Dielectric Waveguides;" *Electronic Letters*; Feb. 17, 2000 vol. 36 No.4.

Yokoyama, S.; Nagata, T.; and Kuroda, Y.; et al.; "Optical Waveguides on Silicon Chips;" *Journal of Vacuum Science & Technology A*, vol. 13, No. 3, May-Jun. 1995.

"5. Switching Fabric Technologies," *Packet Switch Architecture*, CS-534, Dept. of Computer Science, University of Crete, Greece (undated document, file last updated Apr. 2000 by M. Katevenis), http://archvlsi.ics.forth.gr/~kateveni/534/sec5.html, 35 pp.

* cited by examiner

1×N OR N×1 OPTICAL SWITCH HAVING A PLURALITY OF MOVABLE LIGHT GUIDING MICROSTRUCTURES

CROSS-REFERENCE TO RELATED APPLICATIONS

This patent application is a continuation-in-part and claims priority of the following related patent applications: (1) provisional U.S. Patent Application Ser. No. 60/233,672 by Ying Wen Hsu, filed on Sep. 19, 2000 and titled "Method For Switching Optical Signals Using Microstructures;" (2) provisional U.S. Patent Application Ser. No. 60/241,762 by Ying Wen Hsu, filed on Oct. 20, 2000, titled "Method for switching optical signals using microstructures;" (3) U.S. Pat. application Ser. No. 09/837,829 by Ying Wen Hsu, filed on Apr. 17, 2001 and titled "Optical Switching Element Having Movable Optically Transmissive Microstructure;" (4) U.S. patent application Ser. No. 09/837,817 by Ying Wen Hsu, filed on Apr. 17, 2001 and titled "Optical Switching System That Uses Movable Microstructures To Switch Optical Signals In Three Dimensions," all Patent applications of which are expressly incorporated herein by reference. This patent application is also related to U.S. patent application Ser. No. 10/052,829 by Ying Wen Hsu and Arthur Telkamp, filed concurrently with the present patent application and titled "Low Loss Optical Switching System," which is incorporated herein by reference.

BACKGROUND OF THE INVENTION

1. Field of the Invention

The field of the invention is optical switches for switching light and in particular, multiple-stage optical switches having N outputs.

2. Background

Optical switches in various forms are used today in the telecommunication routing applications. At the junctions of these networks, the switches first convert optical signals into electrical signals and then direct (switch) the light into the desired channel. After switching, the electrical signal is converted back into optical signals before it is sent to the next destination. Such repetitive conversions between optical and electrical form increase the cost and power consumption in routing equipment and greatly limit the amount of signals the network is capable of delivering.

Optical switches exist in various configurations. For example, a M×N optical switch refers to a switch having M inputs and N outputs. There is a need for a small optical switch that is capable of switching light into multiple ports, while maintaining low optical loss and having low power dissipation. There is also a need for a cost effective method of fabricating such an optical switch.

SUMMARY OF THE INVENTION

Generally, the improved 1×N or N×1 optical switch uses waveguides or other light guiding structures disposed on a plurality of movable platforms to switch an optical signal from one input port to any of N output ports, or switching any of N input optical signals to one fixed output port.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. Moreover, in the figures, like reference numerals designate corresponding parts throughout the different views. However, like parts do not always have like reference numerals.

DETAILED DESCRIPTION OF THE PREFERRED EMBODIMENTS

The improved 1×N optical switch is a small element capable of switching an optical signal from one input port to any of N output ports, or by reversing the direction, switching any of N input optical signals to one output port. By combining these elements into an array configuration, a large number of ports can be interconnected. These switch arrays are referred to as Optical Cross Connects and are expected to become widely used in future optical telecommunications.

The improved 1×N optical switch is fabricated by arranging an assembly of movable structures, comprising of a main body and at least two independent moving platforms (also referred to as "microstructures"). Optical waveguides are created on these platforms and the main body. By moving these platforms relative to each other, waveguides on one platform are either connected or disconnected from waveguides on the other platform. By controlling the relative motions of the platforms and the geometrical arrangement of the waveguides, an optical signal from one input port can be connected to any one of N output ports. The improved 1×N optical switch is not limited to using waveguides since other light guiding structures or free-space optical transmissions techniques, such as lenses or mirrors, can be employed in place of or in addition to waveguides. In other words, the term "light guiding structure" as used in this patent application includes waveguides, lenses and mirrors. The movable platforms are fabricated by employing Micro-Electrical-Mechanical System (MEMS) technology, which is well known in the art.

Figure 1:
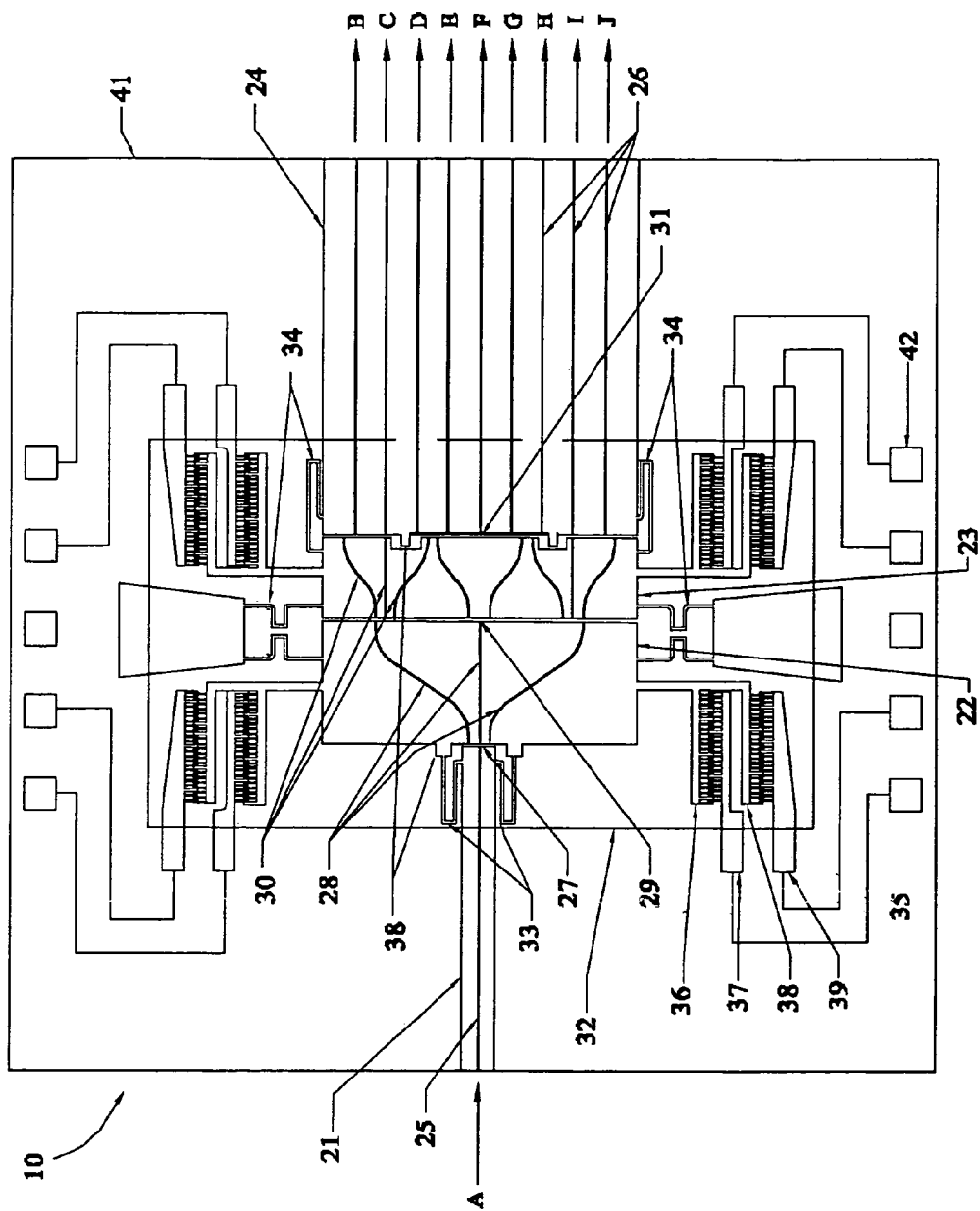
FIG. 1 is an illustration of an example embodiment of a 1×N optical switch where the motion of the moving platforms is linear.

The improved 1×N optical switch is capable of connecting one optical input port to any of N output ports, or in reverse, any of N input signals to one output port. FIG. 1 illustrates an example of a preferred embodiment of the improved 1×N optical switch 10. In particular, FIG. 1 illustrates an example embodiment of a 1×9 optical switch, meaning that the optical signal from one input port A can be switched to any one of nine output ports B–J. In the preferred embodiment of the improved 1×N optical switch, movable microstructures (also called platforms) and waveguides are used to switch optical signals.

The 1×N optical switch 10 has two types of platforms. The first type is the movable platform 22, 23. The second type is the stationary platform 21, 24. The two movable platforms 22, 23 are suspended a distance from the substrate 41 such that each platform is free to move relative to each other. Optionally, a cavity may be formed in the substrate 41 in order to suspend the movable platforms 22, 23 away from the substrate 41. On the top of these platforms 22, 23 are waveguides 28, 30, or other light guiding structures. Preferably, the waveguides 28, 30, 25 and 26 are deposited with a semiconductor process on top of the stationary platforms 21, 24 and the movable platforms 22, 23 using waveguide manufacturing procedures described below and in the art of semiconductor processing. By using the proper geometrical arrangement, at least one waveguide optical path is made between the two movable platforms 22, 23. This concept is similar to the Verniers calipers commonly used in the machine industry for determining the position of an object. In a Verniers caliper, the distance moved or measured is determined by the alignment between two scales in slightly different graduations. In the preferred embodiment of the improved 1×N optical switch, the scales are replaced by optical waveguides. By controlling the position of the movable platforms 22, 23 relative to each other, which platforms carry the waveguides 28, 30, one waveguide can always be made to be connected to the optical path, while the rest are disconnected from the optical path. FIG. 1 illustrates the optical path extending from input port A to output port F. In other words, the only output port connected to the optical path to the input port A is output port F.

Linear Optical Switches

The headings used in this specification are intended to guide the reader and do not limit the scope of the invention in any way. Thus, any disclosures and teachings from one section are applicable to another section, and vice versa.

Preferably, the 1×N optical switch 10 allows the movable platforms 22, 23 to have a single degree-of-freedom motion. Both movable platforms 22, 23 can occupy one of three positions: a center position, a +Y position, or a –Y position. In FIG. 1, the movable platforms 22, 23 move linearly and are referred to as linear platforms. In FIG. 1's illustration of a 1×9 optical switch, the input optical signal can have a path to nine different output ports B–J. With both linear platforms 22, 23 at rest in their center position, which preferably is their position when no power is applied to the optical switch, a default optical signal path is connected straight through from input port A to output port F. When a linear platform 22, 23 moves either +Y or –Y from its center position, the input optical signal path can then be routed to a different output port. In this example embodiment, all signal routings are done with waveguides on stationary platforms 21, 24 and movable platforms 22, 23. Input waveguide 25 and output waveguides 26 are placed over stationary platforms 21, 24 that are mounted or fixed to the substrate 41.

The optical switch 10 in FIG. 1 operates as follows: an optical signal is introduced into the stationary waveguide 25 at input port A. The first movable platform 22 is moved into one of its three positions (up, +Y or –Y). The optical signal then traverses across a small air gap 27 and enters into one of three waveguide paths 28 on the first movable platform 22. From the first movable platform 22, the optical signal (i) travels across a second small air gap 29, (ii) enters into a second movable platform 23, (iii) propagates along one of three waveguide paths 30, depending upon the position (+Y, center or –Y) of the second movable platform 23 relative to the first movable platform 22, (iv) exits by traversing across a third small air gap 31 into one of the stationary waveguides 26, and (v) exits to one of nine output ports B–J.

In the example embodiment, the movable platforms 22, 23 are suspended over a backside-etched opening in the substrate 41 and are supported by springs 33, 34, preferably etched from the same material as the platforms 22, 23. The springs 33, 34 are connected to the substrate 41 by support blocks 35 and stationary platforms 21, 24. The movable platforms 22, 23 are connected to a set of electrodes 36, which preferably have fingers shaped like combs and are interdigitally matched to an opposing set of electrodes 37 fixed to the substrate 41. When an electrical voltage is applied across the two electrodes 36, 37, the voltage differential generates an electrostatic attraction force, causing the platform 22, 23 to move. The movable platform shown in FIG. 1 is a linear platform design and hence, the platform moves in a linear direction. The springs 33, 34 deflect to allow the platform 22, 23 to move to the desired location. The use of electrostatic actuators to move microstructures is well known to those skilled in the art of MEMS design.

Further, the 1×N optical switch 10 preferably attempts to maximize the radii of the curvatures in the waveguides and does not have waveguide path crossovers. The improved 1×N optical switch 10 thus changes the optical path of the waveguide gradually, which reduces optical loss. Furthermore, the movable platforms 22, 23 move along in one direction only, i.e. a single degree of freedom, thus simplifying the design of the controller of the optical switch. A single degree of freedom motion also greatly simplifies the design of the supports and actuators for the movable platforms.

The number of output ports in the improved 1×N optical switch can be increased by increasing the number of platforms, or by increasing the number of movable positions that each movable platform 22, 23 has. For example, an optical switch system that has two movable platforms 22, 23, each platform having three positions, can switch a single input to any of 9 outputs. If another 3-position movable platform is added, the number of possible outputs increases to 27. Similarly, in a system having only two movable platforms, if the number of movable positions of each movable platform is increased from three to five, the number of outputs can be increased to 25. Increasing the number of movable platforms adds complexity to the mechanical design, but increasing the number of positions per movable platform adds complexity to the electronics, which in turn necessitates complex analog and closed-loop control circuits or software.

With the improved 1×N optical switch, the number of output ports N can be determined by the following relationship: $N=L^p$, where p is the number of movable platforms and L is number of positions that each movable platform has, assuming that all movable platforms have the same number of possible positions. If the movable platforms have a different number of positions, a different appropriate formula can be determined.

To enable the waveguides to efficiently conduct light across air gaps, the movable waveguides 22, 23, must be aligned accurately with the fixed waveguides 21, 24. This can be accomplished in two ways. The first is to use a mechanical stop 18. The second is to rely on electronic position control. Mechanical stops can be integrated into the optical switch design. Since each platform 22, 23 moves between two maximum positions, one stop is required for each of the optimum +Y and optimum –Y direction. The achievable alignment accuracy is dependent on the accuracy of the etching process.

FIG. 1 illustrates using an optional set of electrodes 38, 39 for position sensing. The sensing electrodes 38, 39, as with the actuator electrodes 36, 37, are arranged preferably using interdigitated comb-like structures. The capacitance across the electrodes 38, 39 changes as the platforms 22, 23 move, which can be measured using appropriate detection circuits. The platforms 22, 23 can be positioned accurately based on feedback information derived from the measured capacitance signal. To achieve high reliability, the signals from a sensing circuit can also be fed into a closed-loop control circuit such that the movable platform 22, 23 can be driven into the desired position. The electrodes 39 are routed to the edge of the substrate 41 for connection to wire bond pads 42. The electronic designs and method of sensing the position of an object by a measured change in the capacitance are well known to those skilled in design of MEMS structures.

A preferred method of manufacture of the improved 1×N optical switch uses silicon on insulator (SOI) wafers. SOI are wafers covered with a thin silicon oxide ($SiO_2$) layer acting as an insulator, and a thin silicon layer bonded on top that serves as a device layer. The waveguides are formed on top of this device layer by depositing a thin layer of oxide using Plasma Enhanced Chemical Vapor Deposition (PECVD). A layer of silicon oxynitride (SiOxNy) is deposited and patterned by photolithographic processing. Finally the oxynitride is covered with another oxide layer which acts as a cladding. The device layer supporting the waveguides is then shaped by using any well known etching technique. In the example embodiment, the completed MEMS structures and movable platforms are suspended over an etched bottom cavity, supported by springs 33, 34 etched out of the same material as the movable platforms. The movable platforms 22, 23 are connected integrally to a set of comb shaped electrodes 36–39 which are used for electrostatic driving and capacitance position sensing.

The term "integral" as used in this patent application and claims refers to two structures that are coupled together by a semiconductor process. For example, if X is attached to Y by screws or bolts, X is not "integral" with Y. Further, the term "integral" does not require the two structures to be formed out of monolithic materials; two structures can be deemed integral to each other if the structures are formed out of composite or multiple materials, as well as if the structures are formed out of monolithic materials. For example, X can be integral with Y even if X is a platform coupled to a device layer which has been formed on a substrate by a semiconductor process. Lastly, X can be integral with Y even if X is silicon with a doped material and Y is silicon doped differently as long as the silicon are coupled together by a semiconductor process.

Variations of the manufacturing process from those described herein are also permissible. For example, instead of using PECVD oxides, thermally grown oxides can be used; or instead of using oxynitride, one can use silica doped with germanium or other dopants. The final choice of the process and material depends on the system design and the designer's familiarity with certain waveguide and MEMS processes.

In designing optical switches, one of the key factors is Insertion Loss, a parameter that is a measure of the amount of light lost as a result of the optical signal traversing through the optical switch. Insertion loss is due to a number of contributors such as those related to fiber-to-waveguide coupling, waveguide transmission, waveguide crossovers, waveguide bends and air gaps. With respect to fiber-to-waveguide coupling, losses may be due to reflection of light at interfaces and mode mismatches. With respect to waveguide transmission, losses may be due to bulk absorption (e.g., loss due to the absorption of light by the waveguide material), scattering due to core sidewall roughness and coupling losses to the substrate or neighboring waveguides. With respect to waveguide crossovers, there may be diffraction losses. With respect to waveguide bends, bend losses (e.g., losses due to light traversing a curved path in the waveguide) may occur. With respect to air gaps, losses may be due to reflection of light at waveguide-air interfaces and diffraction of light as the light propagates unguided through free space. Thus, the design should minimize individual losses and balance the losses between different mechanisms in order to yield the lowest total insertion loss. In addition to the insertion loss and small element size, other requirements such as power, switching time and polarization effects are also important to consider.

Rotational Optical Switches

Figure 2:
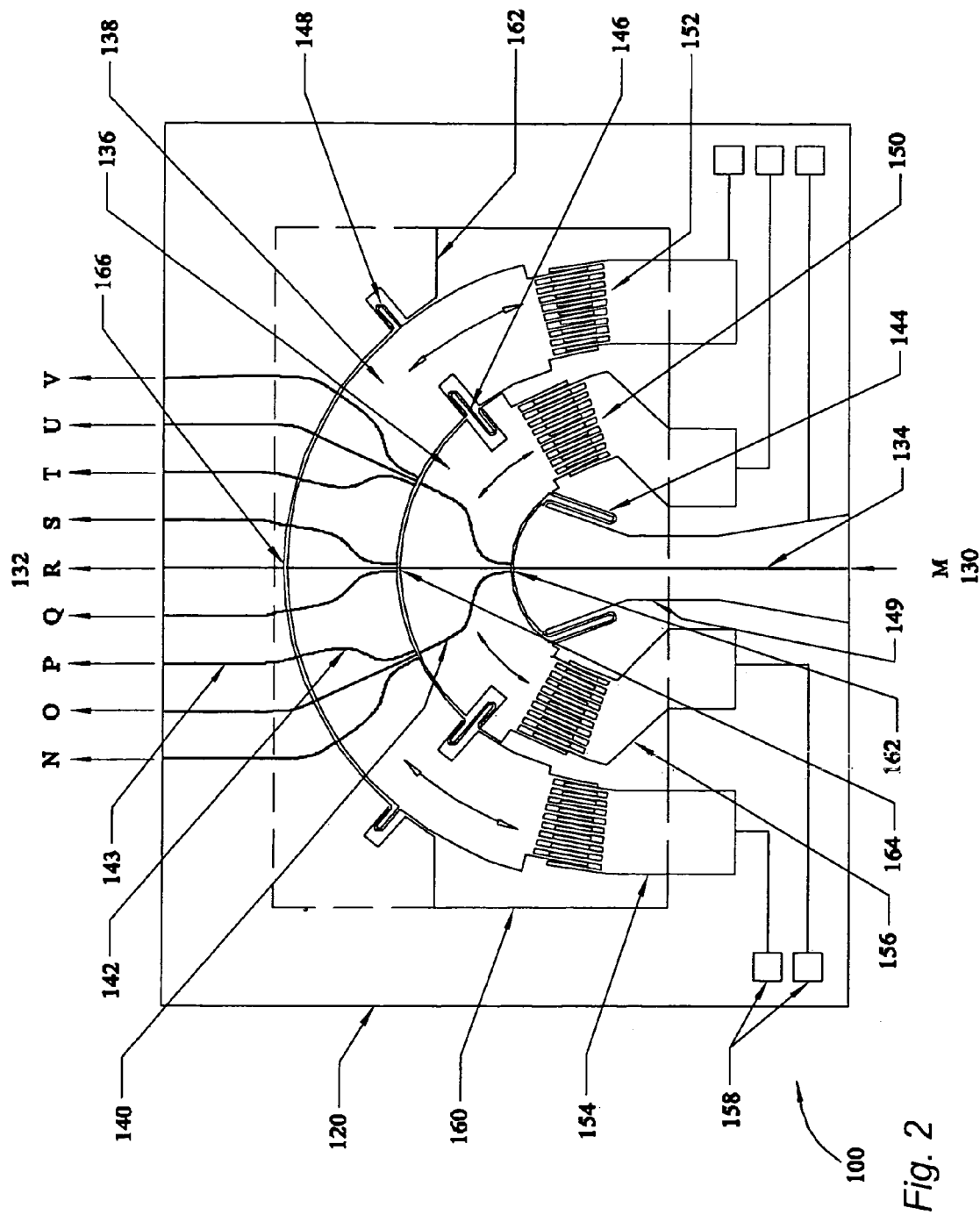
FIG. 2 is an illustration of another example embodiment of a 1×N optical switch where the motion of the moving platforms is rotational.

FIG. 2 illustrates another example embodiment of a 1×N optical switch 100 where the motion of the moving platforms 136, 138 is rotational rather than linear. An input light signal 130 enters port M through a waveguide 134 and is routed to any one of the 9 output ports 132 (e.g., N to V) by virtue of movably positioning platforms 136 and 138. The terms "movable" or "movably" as used anywhere in this disclosure are intended to include both rotational and linear movements, as well as other possible movements. If movable platform 136 is rotated clockwise, the stationary waveguide 134 can be made to align with waveguide 140 on the movable platform 136. When the movable platform 136 is in this rotated position relative to the second stationary platform 138, the waveguide 140 is in alignment with waveguide 142, and subsequently with waveguide 143. In this fashion, the optical signal is routed from input port M to output port P. By properly arranging the relative placement of the movable waveguides 136, 138, the optical signal can be completely routed from input port M to any one of output ports N–V, while limiting the motion of each of the movable platforms 136, 138 to only three positions (neutral, clockwise and counter-clockwise).

In the example embodiment illustrated in FIG. 2, each movable platform 136, 138 has a small number of positions (e.g., three positions), which allows each platform 136, 138 to move and locate in a "digital" manner: the movable platform 136, 138 has only two possible positions from its rest position. In this fashion, the movable platforms 136, 138 can be stopped using either mechanical hard stops or an electronic closed-loop control. The use of mechanical hard stops is preferred because it simplifies the design. As with the linear platform design, additional platforms or additional movable positions can be added to accommodate a larger number of output ports. The trade-offs for the rotational optical switch are similar to those for the linear optical switch.

In the example embodiment, the connection of an optical path over multiple waveguides requires the optical signal to "jump" across three air gaps 162, 164, 166. These air gaps should be kept small to minimize any optical losses. As explained above, the contributions to optical loss due to air gaps include the diffraction of light as it crosses free space and the reflection of light at interfaces. A virtue of MEMS technology is that the air gaps can be kept very small, thereby reducing the loss associated with the air gaps.

Referring to FIG. 2, the 1×N optical switch has two movable platforms 136 and 138 supported by springs 144, 146, 148, which are in turn supported by support structures 149, 162. The springs are designed to allow rotational movements, but resist radial movements. The movable platforms 136, 138 are suspended a distance over a cavity 160 that has been etched into the substrate 120. Methods of fabricating the optical switch structures as shown is discussed later.

Movable platforms 136, 138 can be rotated using actuators 150, 152, preferably formed out of the same structure as the platforms. These actuators are generally known in the MEMS industry as "comb" fingers and are known to those skilled in the art of MEMS design. In addition to actuation, comb structures can also be used for position sensing. The change in the capacitance as a result of the change in the relative position of the moving and stationary structures can be monitored to accurately determine the position of the moving structure. The stationary structures 154, 156 that supports the comb structures are suspended over the cavity 160 in the same way the moving platforms 136, 138 are suspended by their support structure 149. The actuators and sensors are connected by electrical traces routed to bonding pads 158.

MEMS Process Description

Figure 3:
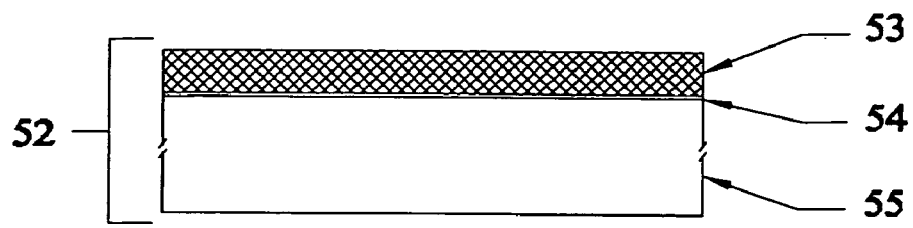
FIGS. 3–9 are cross-sectional illustrations of steps in an example process of fabricating an optical component.

The following is the description of an example embodiment of an improved process for integrating optical waveguides and movable structures on silicon, where the details of the description are meant to be illustrative and not limiting. Referring to FIG. 3, the process starts with standard silicon on insulator (SOI) wafer 52 as the base substrate. Both silicon layers of the SOI assembly are specified to have the same properties: grade—prime; crystal orientation—100; dopant—P-type (Boron); resistivity—1–20 ohms/cm; surface quality—polished on both sides. Any standard wafer diameter can be used according to the number of devices the user requires or which can be efficiently laid out over the area. The thickness of the top SOI or device layer 53 is approximately 15 microns thick and lies over a 1 micron buried oxide layer 54. The base or handle wafer 55 can vary in thickness from 350–750 microns depending upon the wafer diameter.

Figure 4:
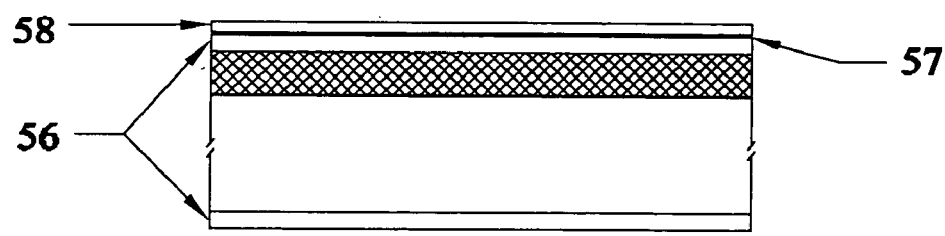
Figure 5:
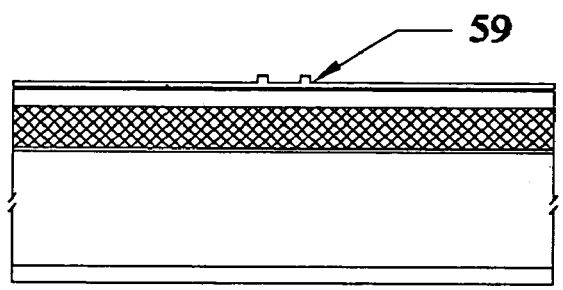
Figure 6:
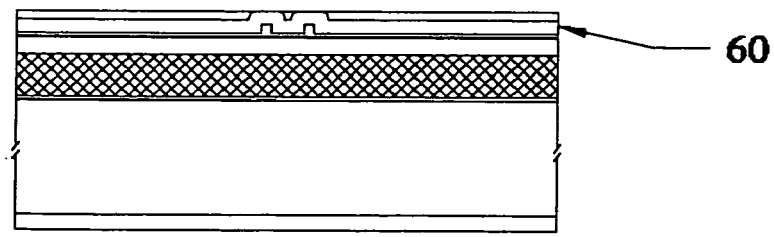
Figure 7:
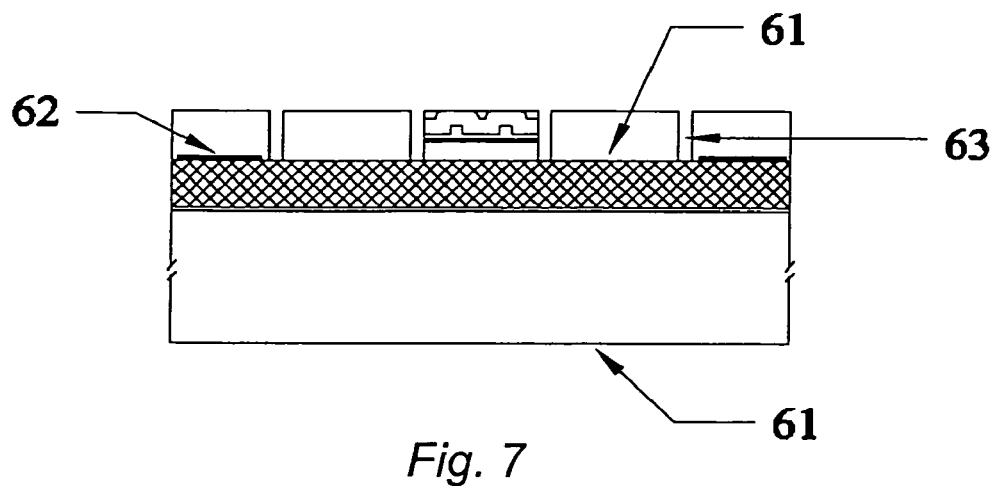

To produce the waveguides, a 5.7-micron layer of $SiO_2$ 56 is deposited on each side of the wafer as shown in FIG. 4. A 1-micron layer of PECVD oxide 57 is then deposited. This is followed by deposition of another 3.7-micron layer of SiOxNy 58 as shown in FIG. 3. In the preferred embodiment of the improved MEMS process, a photolithography process etches back at least 2.4 microns of the SiOxNy to form the core of the waveguides 59. 4.6 microns of SiO2 is then deposited on the top surface as a cladding layer 60. A photoresist, mask and expose step is processed, etching the front and back surfaces to bare silicon, leaving the waveguide areas raised on top of the 15-micron SOI surface as shown in FIG. 7.

A photoresist, mask and expose step for bond pads and traces is then performed. A layer of metal is deposited and lifted off, leaving metalized traces 62. MEMS features are established by another photoresist mask and expose step, then etching, to remove 3–4 microns wide of silica in gap areas 63.

Figure 8:
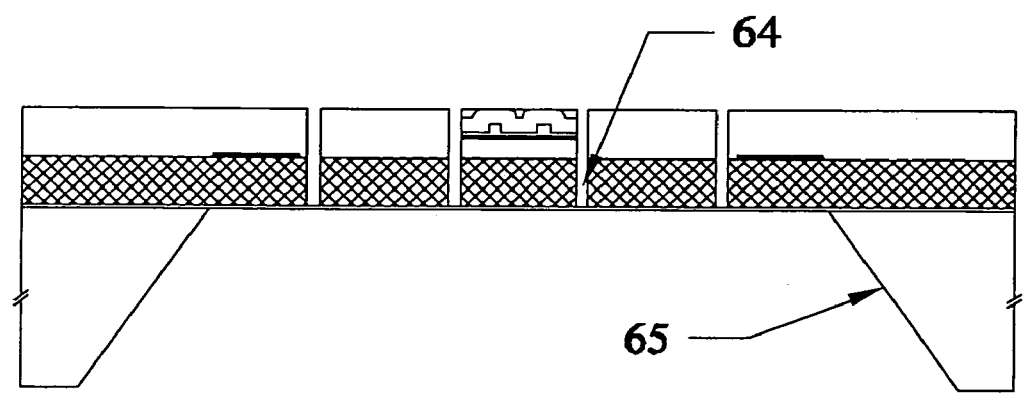
Figure 9:
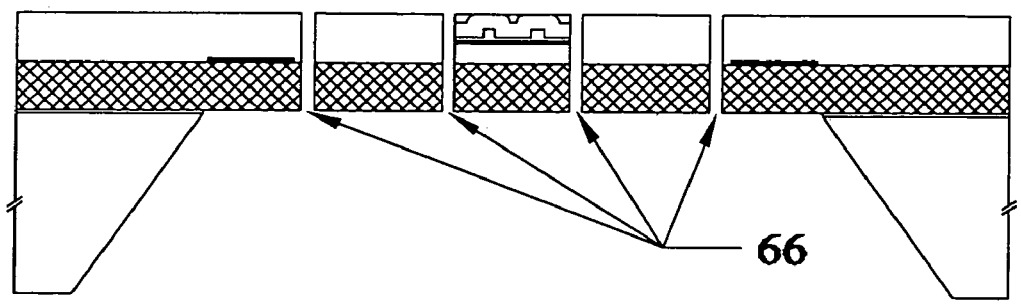

After the waveguides are processed, the underlying silicon structures (e.g., the combs, springs and platforms) need to be formed. In FIG. 8, an RIE (reactive ion etch) process etches the gaps in the silica down through the 15-micron device layer to the SOI buried oxide 64. In FIG. 9, another lithography process on the wafer backside, followed by anisotropic wet etch through the wafer bottom to the SOI buried oxide layer 65, leaves 54.7-degree sidewalls. The silicon structure is finally "released" by etching the buried oxide layer, thus completely separates the gaps in the silicon 66.

Advantageously, the improved MEMS process allows one to etch from the bottom of the substrate and through the oxide. This is an advantage because the process provides a natural etch stop with the oxide and the final release is a DRY etch of oxides. Prior art processes of SOI rely on a wet etch of the oxide from the top (with etch holes on the structure). The process also provides electrical isolation for various electrodes by etching trenches on the device layer, forming electrical conductive traces separated by trenches on the sides, and by oxide on the bottom.

The improved process represents a simple and effective method of fabricating structures for the improved optical switch. Other processing techniques and materials (quartz, metal, alloys and ceramics) can be implemented to produce the same or similar configuration. The method and the sequence of fabrication can be altered to yield the same or similar finished device. For example, instead of using SOI, it is possible to bond two silicon wafers to produce the finished device. The phrase "semiconductor process" is intended to include bonding semiconductor wafers to produce a device. The advantage of bonding wafers is that the gap underneath the free structure can be produced without the need to create an opening from the bottom. Yet other contemplated processes involve dissolving the oxide underneath the structural layer by wet etching techniques. To do so, the structural layer must have an opening to allow for the etchant to reach underneath the structural layer. These additional methods are generally well known to those skilled in the art of MEMS fabrication.

While various embodiments of the application have been described, it will be apparent to those of ordinary skill in the art that many more embodiments and implementations are possible that are within the scope of the subject invention. For example, each feature of one embodiment can be mixed and matched with other features shown in other embodiments. Features known to those of ordinary skill in the art of optics may similarly be incorporated as desired. Additionally and obviously, features may be added or subtracted as desired and thus, a movable platform having more than three or more positions is contemplated such that each position activates a different set of optical paths. As another example, the optical switch may accept more than 2 inputs and provide more than 2 outputs. The optical switch may be combined so as to create bigger optical switches with more ports. The 1×N optical switch can be reversed to create a N×1 optical switch, where an optical signal from one of N input ports is routed to the input port. Accordingly, the invention is not to be restricted except in light of the attached claims and their equivalents.

We claim:

1. A method for fabricating an optical switch which switches an optical signal from an input port into any one of N output ports, the method comprising the steps of:

providing a substrate;

creating first and second movable platforms by a semiconductor process on the substrate, wherein the first and second movable platforms are arc-shapped and move relative to the substrate;

creating a stationary platform on the substrate by a semiconductor process;

forming first and second light guiding structures on the first movable platform;

forming third and fourth light guiding structures on the second movable platform;

forming a fifth light guiding structure on the stationary platform;

wherein the position of the first movable platform determines whether the optical signal propagates through the first or second light guiding structures and the position of the second movable platform determines whether the optical signal propagates through the third or fourth light guiding structures, thereby creating an optical path from the input port to one of the N output ports.

2. The method of claim 1 wherein the first and second movable platforms have a single degree of movement freedom relative to the substrate.

3. The method of claim 2 wherein the first and second movable platforms are adapted to rotate.

4. The method of claim 1 further comprising the step of creating a cavity in the substrate so that the first and second movable platforms are suspended at a distance from the substrate.

5. The method of claim 4 further comprising the step of creating a spring support structure where one end of the spring support structure is mounted to the substrate and the other end of the spring support structure is coupled to the first movable platform, the spring support structure permitting the first movable platform to move relative to the substrate.

6. The method of claim 1 wherein the first light guiding structure includes a waveguide.

7. The method of claim 6 wherein the third light guiding structure includes a waveguide.

8. The method of claim 6 wherein the fifth light guiding structure includes a waveguide.

9. The method of claim 7 wherein the fifth light guiding structure includes a waveguide.

10. The method of claim 1 wherein if the positions of the first movable platform, the second movable platform and the stationary platform are changed relative to one another, the optical signal propagates along a different optical path from the input port to a different one of the N output ports.

11. The method of claim 10 wherein the optical path and the different optical path do not cross.

12. The method of claim 11 wherein none of the N optical paths cross one another.

13. The method of claim 1 wherein the step of forming a first light guiding structure creates a first light guiding structure having a large radius of curvature which gradually changes the direction of the optical signal.

14. The method of claim 13 wherein the step of forming a third light guiding structure creates a third light guiding structure having a large radius of curvature which gradually changes the direction of the optical signal.

15. The method of claim 14 wherein the step of forming a fifth light guiding structure creates a fifth light guiding structure having a large radius of curvature which gradually changes the direction of the optical signal.

16. The method of claim 1 wherein the steps of forming the first, second, third and fourth light guiding structures include depositing the first, second, third and fourth light guiding structures onto the first and second movable platforms.

17. The method of claim 1 wherein the fifth light guiding structure on the first stationary platform is positioned to receive the optical signal from the input port and propagates the optical signal to the first light guiding structure on the first movable platform, the first light guiding structure propagating the optical signal to the second light guiding structure on the second movable platform.

18. The method of claim 17 further comprising the step of forming a sixth light guiding structure on a second stationary platform, where the second light guiding structure on the second movable platform propagates the optical signal to the sixth light guiding structure.

19. The method of claim 1 further comprising the step of forming a sixth light guiding structure on the stationary platform, where the position of the second movable platform determines whether the optical signal propagates to the fifth or sixth light guiding structures.

20. The method of claim 1 wherein the first, second, third, fourth and fifth light guiding structures do not cross one another.

21. The method of claim 1 further comprising the step of forming an activation electrode coupled to the first movable platform, the actuator including an actuation electrode positioned to interact electrostatically with the activation electrode.

22. The method of claim 21 wherein the actuation electrode and activation electrode are inter-digitized.

23. The method of claim 1 further comprising the step of forming a sensing electrode for determining the position of the first movable platform.

24. The method of claim 3 wherein the first light guiding structure includes a waveguide.

25. The method of claim 24 wherein the third light guiding structure includes a waveguide.

26. The method of claim 24 wherein the fifth light guiding structure includes a waveguide.

27. The method of claim 25 wherein the fifth light guiding structure includes a waveguide.

28. The method of claim 3 wherein if the positions of the first movable platform, the second movable platform and the stationary platform are changed relative to one another, the optical signal propagates along a different optical path from the input port to a different one of the N output ports.

29. The method of claim 28 wherein the optical path and the different optical path do not cross.

30. The method of claim 29 wherein none of the N optical paths cross one another.

31. The method of claim 3 wherein the step of forming a first light guiding structure creates a first light guiding structure having a large radius of curvature which gradually changes the direction of the optical signal.

32. The method of claim 31 wherein the step of forming a third light guiding structure creates a third light guiding structure having a large radius of curvature which gradually changes the direction of the optical signal.

33. The method of claim 32 wherein the step of forming a fifth light guiding structure creates a fifth light guiding structure having a large radius of curvature which gradually changes the direction of the optical signal.

34. The method of claim 3 wherein the fifth light guiding structure on the first stationary platform is positioned to receive the optical signal from the input port and propagates the optical signal to the first light guiding structure on the first movable platform, the first light guiding structure propagating the optical signal to the second light guiding structure on the second movable platform.

35. The method of claim 34 further comprising the step of forming a sixth light guiding structure on a second stationary platform, where the second light guiding structure on the second movable platform propagates the optical signal to the sixth light guiding structure.

36. The method of claim 3 further comprising the step of forming a sixth light guiding structure on the stationary platform, where the position of the second movable platform determines whether the optical signal propagates to the fifth or sixth light guiding structures.

37. The method of claim 3 wherein the first, second, third, fourth and fifth light guiding structures do not cross one another.

38. The method of claim 3 further comprising the step of forming an activation electrode coupled to the first movable platform, the actuator including an actuation electrode positioned to interact electrostatically with the activation electrode.

39. The method of claim 3 further comprising the step of forming a sensing electrode for determining the position of the first movable platform.

40. A device for switching an optical signal from an input port into any one of N output ports, the device comprising:
a substrate;
first and second movable platforms formed by a semiconductor process on the substrate, wherein the first and second movable platforms are arc-shaped and move relative to the substrate;
a stationary platform formed by a semiconductor process on the substrate;
first and second light guiding structures formed on the first movable platform;
third and fourth light guiding structures formed on the second movable platform;
a fifth light guiding structure formed on the stationary platform;
wherein the position of the first movable platform determines whether the optical signal propagates through the first or second light guiding structures and the position of the second movable platform determines whether the optical signal propagates through the third or fourth light guiding structures, thereby creating an optical path from the input port to one of the N output ports.

41. The device of claim 40 wherein the first and second movable platforms have a single degree of movement freedom relative to the substrate.

42. The device of claim 40 wherein the first and second movable platforms are adapted to rotate.

43. The device of claim 40 further comprising a cavity in the substrate where the first and second movable platforms are suspended at a distance from the cavity of the substrate.

44. The device of claim 43 further comprising a spring support structure where one end of the spring support structure is mounted to the substrate and the other end of the spring support structure is coupled to the first movable platform, the spring support structure permitting the first movable platform to move relative to the substrate.

45. The device of claim 40 wherein the first light guiding structure includes a waveguide.

46. The device of claim 45 wherein the third light guiding structure includes a waveguide.

47. The device of claim 45 wherein the fifth light guiding structure includes a waveguide.

48. The device of claim 46 wherein the fifth light guiding structure includes a waveguide.

49. The device of claim 40 wherein if the positions of the first movable platform, the second movable platform and the stationary platform are changed relative to one another, the optical signal propagates along a different optical path from the input port to a different one of the N output ports.

50. The device of claim 49 wherein the optical path and the different optical path do not cross.

51. The device of claim 50 wherein none of the N optical paths cross one another.

52. The device of claim 40 wherein the first light guiding structure has a large radius of curvature which gradually changes the direction of the optical signal.

53. The device of claim 52 wherein the third light guiding structure has a large radius of curvature which gradually changes the direction of the optical signal.

54. The device of claim 53 wherein the fifth light guiding structure has a large radius of curvature which gradually changes the direction of the optical signal.

55. The device of claim 40 wherein the fifth light guiding structure on the first stationary platform is positioned to receive the optical signal from the input port and propagates the optical signal to the first light guiding structure on the first movable platform, the first light guiding structure propagating the optical signal to the second light guiding structure on the second movable platform.

56. The device of claim 55 further comprising a sixth light guiding structure formed on a second stationary platform, the second light guiding structure on the second movable platform propagating the optical signal to the sixth light guiding structure.

57. The device of claim 40 further comprising a sixth light guiding structure on the stationary platform, where the position of the second movable platform determines whether the optical signal propagates to the fifth or sixth light guiding structures.

58. The device of claim 40 wherein the first, second, third, fourth and fifth light guiding structures do not cross one another.

59. The device of claim 40 further comprising an activation electrode coupled to the first movable platform, the actuator including an actuation electrode positioned to interact electrostatically with the activation electrode.

60. The device of claim 59 wherein the actuation electrode and activation electrode are inter-digitized.

61. The device of claim 40 further comprising a sensing electrode for determining the position of the first movable platform.

62. The device of claim 40 wherein the first light guiding structure is coupled to the third or fourth light guiding structures by an air gap.

63. The device of claim 40 wherein the first movable platform has a sixth light guiding structure, the first movable platform moving between a first position, a second position and a third position, where the optical signal propagates through the first light guiding structure when the first movable platform is in the first position, the optical signal propagates through the second light guiding structure when the first movable platform is in the second position, and the optical signal propagates through the sixth light guiding structure when the first movable platform is in the third position.

64. The device of claim 63 wherein the second movable platform has a seventh light guiding structure, the second movable platform moving between a first position, a second position and a third position, where the optical signal propagates through the third light guiding structure when the second movable platform is in the first position, the optical signal propagates through the fourth light guiding structure when the second movable platform is in the second position, and the optical signal propagates through the seventh light guiding structure when the second movable platform is in the third position.

65. The device of claim 40 wherein a radius of the second platform is greater than a radius of the first platform.

66. A device for switching an optical signal from any one of N input ports to an output port, the device comprising:

a substrate;

first and second movable platforms formed by a semiconductor process on the substrate, wherein the first and second movable platforms are arc-shaped and move relative to the substrate;

a stationary platform formed by a semiconductor process on the substrate;

first and second light guiding structures formed on the first movable platform;

third and fourth light guiding structures formed on the second movable platform;

a fifth light guiding structure formed on the stationary platform;

wherein the position of the first movable platform determines whether the optical signal propagates through the first or second light guiding structures and the position of the second movable platform determines whether the optical signal propagates through the third or fourth light guiding structures, thereby creating an optical path from one of the N input ports to the output port.

67. The device of claim 66 wherein the first and second movable platforms have a single degree of movement freedom relative to the substrate.

68. The device of claim 67 wherein the first and second movable platforms are adapted to rotate.

69. A device for switching an optical signal from an input port to one of N output ports, the device comprising:
a substrate;
first, second and Nth movable platforms formed by a semiconductor process on the substrate, wherein the first, second and Nth movable platforms are arc-shaped and move relative to the substrate;
a first light guiding structure located on the first movable platform;
a second light guiding structure located on the second movable platform;
an Nth light guiding structure located on the Nth movable platform;
wherein the positions of the first, second and Nth movable platforms determine which one of the N possible optical paths is connected between the input port and one of the N output ports, the N possible optical paths being configured so that each of the N optical paths does not cross any of the other N optical paths.

70. The device of claim 69 wherein the first, second and Nth movable platforms have a single degree of movement freedom relative to the substrate.

71. The device of claim 69 wherein the first, second and Nth movable platforms are adapted to rotate.

72. The device of claim 69 wherein the first light guiding structure has a large radius of curvature which gradually changes the direction of the optical signal.

73. The device of claim 72 wherein the second light guiding structure has a large radius of curvature which gradually changes the direction of the optical signal.

74. The device of claim 73 wherein the Nth light guiding structure has a large radius of curvature which gradually changes the direction of the optical signal.

75. A device for switching an optical signal from an input port into any one of N output ports, the device comprising:
a substrate;
first and second movable platforms formed by a semiconductor process on the substrate, wherein the first and second movable platforms are arc-shaped and move relative to the substrate;
a stationary platform formed by a semiconductor process on the substrate;
first and second mirrorless light guiding structures formed on the first movable platform;
third and fourth mirrorless light guiding structures formed on the second movable platform;
a fifth light guiding structure formed on the stationary platform;
wherein the position of the first movable platform determines whether the optical signal propagates through the first or second mirrorless light guiding structures and the position of the second movable platform determines whether the optical signal propagates through the third or fourth mirrorless light guiding structures, thereby creating an optical path from the input port to one of the N output ports.

76. The device of claim 75 wherein the first and second movable platforms have a single degree of movement freedom relative to the substrate.

77. The device of claim 75 wherein the first and second movable platforms are adapted to rotate.

78. The device of claim 75 further comprising a cavity in the substrate where the first and second movable platforms are suspended at a distance from the cavity of the substrate.

79. The device of claim 78 further comprising a spring support structure where one end of the spring support structure is mounted to the substrate and the other end of the spring support structure is coupled to the first movable platform, the spring support structure permitting the first movable platform to move relative to the substrate.

80. The device of claim 75 wherein the first mirrorless light guiding structure is a waveguide.

81. The device of claim 80 wherein the third mirrorless light guiding structure is a waveguide.

82. The device of claim 80 wherein the fifth light guiding structure is a waveguide.

83. The device of claim 81 wherein the fifth light guiding structure is a waveguide.

84. The device of claim 75 wherein if the positions of the first movable platform, the second movable platform and the stationary platform are changed relative to one another, the optical signal propagates along a different optical path from the input port to a different one of the N output ports.

85. The device of claim 82 wherein the optical path and the different optical path do not cross.

86. The device of claim 85 wherein none of the N optical paths cross one another.

87. The device of claim 75 wherein the first mirrorless light guiding structure has a large radius of curvature which gradually changes the direction of the optical signal.

88. The device of claim 87 wherein the third mirrorless light guiding structure has a large radius of curvature which gradually changes the direction of the optical signal.

89. The device of claim 87 wherein the fifth light guiding structure has a large radius of curvature which gradually changes the direction of the optical signal.

90. The device of claim 75 wherein the fifth light guiding structure on the first stationary platform is positioned to receive the optical signal from the input port and propagates the optical signal to the first mirrorless light guiding structure on the first movable platform, the first mirrorless light guiding structure propagating the optical signal to the second mirrorless light guiding structure on the second movable platform.

91. The device of claim 90 further comprising a sixth light guiding structure formed on a second stationary platform, the second mirrorless light guiding structure on the second movable platform propagating the optical signal to the sixth light guiding structure.

92. The device of claim 75 further comprising a sixth light guiding structure on the stationary platform, where the position of the second movable platform determines whether the optical signal propagates to the fifth or sixth light guiding structures.

93. The device of claim 75 wherein the first, second, third, fourth and fifth light guiding structures do not cross one another.

94. The device of claim 75 further comprising an activation electrode coupled to the first movable platform, the actuator including an actuation electrode positioned to interact electrostatically with the activation electrode.

95. The device of claim 94 wherein the actuation electrode and activation electrode are inter-digitized.

96. The device of claim 75 further comprising a sensing electrode for determining the position of the first movable platform.

97. The device of claim 75 wherein the first mirrorless light guiding structure is coupled to the third or fourth mirrorless light guiding structures by an air gap.

98. The device of claim 75 wherein the first movable platform has a sixth light guiding structure, the first movable platform moving between a first position, a second position and a third position, where the optical signal propagates through the first mirrorless light guiding structure when the first movable platform is in the first position, the optical signal propagates through the second mirrorless light guiding structure when the first movable platform is in the second position, and the optical signal propagates through the sixth light guiding structure when the first movable platform is in the third position.

99. The device of claim 98 wherein the second movable platform has a seventh light guiding structure, the second movable platform moving between a first position, a second position and a third position, where the optical signal propagates through the third mirrorless light guiding structure when the second movable platform is in the first position, the optical signal propagates through the fourth mirrorless light guiding structure when the second movable platform is in the second position, and the optical signal propagates through the seventh light guiding structure when the second movable platform is in the third position.

100. The device of claim 75 wherein a radius of the second platform is greater than a radius of the first platform.

\* \* \* \* \*